(12) United States Patent
Goldschmidt Iki et al.

(10) Patent No.: US 6,483,987 B1
(45) Date of Patent: *Nov. 19, 2002

(54) METHOD AND APPARATUS FOR RECORDING PROGRAM DATA WITHOUT COMMERCIALS

(75) Inventors: Jean M. Goldschmidt Iki, San Jose, CA (US); Anthony Alexander Shah-Nazaroff, Santa Clara, CA (US); Christopher D. Williams, Soquel, CA (US); Kathleen Lane, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 09/696,563

(22) Filed: Oct. 25, 2000

Related U.S. Application Data

(62) Division of application No. 08/940,355, filed on Sep. 30, 1997, now Pat. No. 6,226,441.

(51) Int. Cl.[7] .............................. H04N 5/91; H04N 7/00
(52) U.S. Cl. ........................................... 386/83; 386/46
(58) Field of Search .............................. 386/83, 46–52, 386/4, 54, 93, 95, 96; 358/908; 348/906, 722, 907, 460; H04N 5/91, 7/00

(56) References Cited

U.S. PATENT DOCUMENTS

| | | | |
|---|---|---|---|
| 4,390,904 A | | 6/1983 | Johnston et al. |
| 4,602,297 A | * | 7/1986 | Reese |
| 4,750,052 A | | 6/1988 | Poppy et al. |
| 4,750,053 A | | 6/1988 | Allen |
| 4,752,834 A | | 6/1988 | Koombes |
| 4,782,401 A | | 11/1988 | Faerber et al. |
| 5,151,788 A | | 9/1992 | Blum |
| 5,333,091 A | | 7/1994 | Iggulden et al. |
| 5,423,555 A | | 6/1995 | Kidrin |
| 5,646,675 A | * | 7/1997 | Copriviza et al. |
| 5,696,866 A | | 12/1997 | Iggulden et al. |
| 5,812,732 A | | 9/1998 | Dettmer et al. |
| 5,850,218 A | | 12/1998 | LaJoie et al. |
| 5,886,731 A | | 3/1999 | Ebisawa |
| 6,226,444 B1 | * | 5/2001 | Goldschmidt Iki et al. |

* cited by examiner

Primary Examiner—Robert Chevalier
(74) Attorney, Agent, or Firm—Blakely, Sokoloff, Taylor & Zafman LLP

(57) ABSTRACT

A method and apparatus for managing recording of broadcast data is disclosed. In one embodiment, the invention includes providing the broadcast data to a video recording device and delaying the broadcast data that is provided to the video recording device sufficient to allow for the finding of an indicator and the transmitting of a command to the video recording device. The broadcast data is recorded using the video recording device and monitored for a commercial indicator and for a program indicator. If a commercial indicator is found, a command is transmitted to the video recording device to stop recording. If a commercial indicator is not found, recording continues. If a program indicator is found, a command is transmitted to the video recording device to resume recording and if a program indicator is not found, the recording stop continues.

17 Claims, 8 Drawing Sheets

METHOD AND APPARATUS FOR RECORDING PROGRAM DATA WITHOUT COMMERCIALS

CROSS-REFERENCE TO RELATED APPLICATIONS

This application is a divisional of prior U.S. patent application Ser. No. 08/940,355, filed Sep. 30, 1997, now U.S. Pat. No. 6,226,441 B1, and assigned to the assignee of the present application.

FIELD OF THE INVENTION

The present invention relates to the field of entertainment systems. Specifically, the present invention relates to a method and apparatus for recording broadcast data without commercials.

BACKGROUND OF THE INVENTION

Video recording and playback devices are widespread in use and are operable in a record mode to record broadcast data on a recordable medium. In a playback mode, the video recording and playback device is operable to couple the recorded broadcast data to a display device where it may be viewed at the convenience of the viewer. The use of video recording and playback devices has enabled viewers of broadcast data to control their viewing habits.

In the past, it was necessary for a viewer to manually stop and restart the record mode to prevent the recording of undesired portions of broadcast data such as advertising commercials which are typically interspread throughout desired program data. In order to provide an additional degree of convenience, the video equipment industry has attempted to provide devices that control the video recording and playback device in its record mode to automatically inhibit the recording of unwanted advertising commercials.

One technique used in the past to detect commercials was the monitoring of the amplitude of the video and audio signal of the broadcast data for a drop of the video signal to a black level and a drop of the audio signal to a zero sound level. One disadvantage, however, on relying on a drop of the video and audio signals to indicate the broadcast of a commercial is that video and audio signals may also drop during the broadcast of program data, thus falsely indicating the broadcast of a commercial. This produces the undesirable result of taking the video recording and playback device out of the record mode during the broadcast of program data.

SUMMARY OF THE INVENTION

A method and apparatus for managing recording of broadcast data is disclosed. In one embodiment, the invention includes providing the broadcast data to a video recording device and delaying the broadcast data that is provided to the video recording device sufficient to allow for the finding of an indicator and the transmitting of a command to the video recording device. The broadcast data is recorded using the video recording device and monitored for a commercial indicator and for a program indicator. If a commercial indicator is found, a command is transmitted to the video recording device to stop recording. If a commercial indicator is not found, recording continues. If a program indicator is found, a command is transmitted to the video recording device to resume recording and if a program indicator is not found, the recording stop continues.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION OF THE INVENTION

Figure 1:
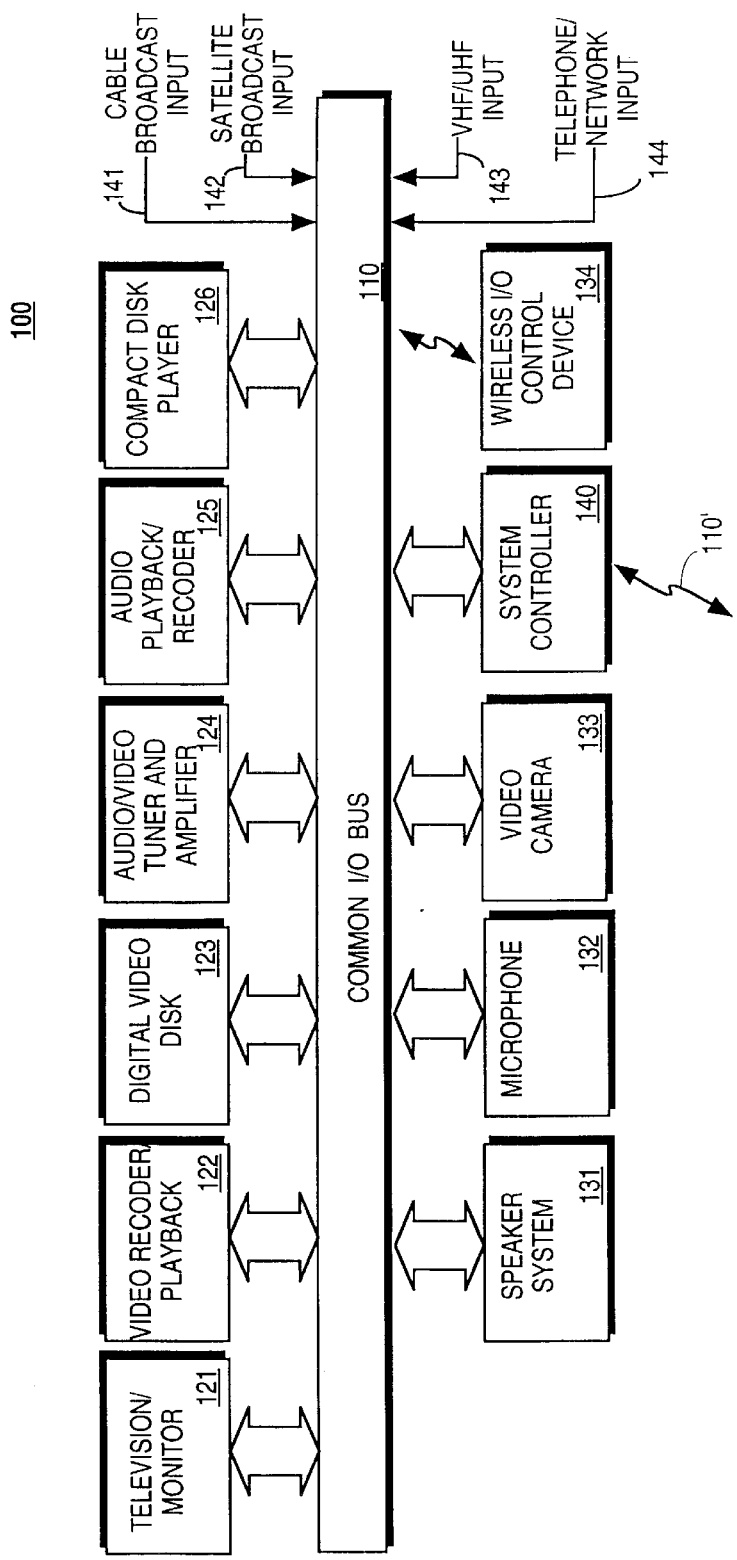
FIG. 1 is a block diagram illustrating the system components of one embodiment of an entertainment system according to the present invention.

FIG. 1 is a block diagram illustrating system components of an entertainment system 100 according to one embodiment of the present invention. The entertainment system includes a common input/output (I/O) bus 110 that connects the system components in the entertainment system 100 together. It should be appreciated that the common I/O bus 110 is illustrated to simplify the routing of signals between the computer system components. The common I/O bus 110 may represent a plurality of known mechanisms and techniques for routing I/O signals between the computer system components. For example, the common I/O bus 110 may include an appropriate number of independent audio "patch" cables that rout audio signals, coaxial cables that rout video signals, two-wire serial lines or infrared or radio frequency transceivers that rout control signals, or other routing mechanisms that rout other signals.

In the illustrated embodiment, the entertainment system 100 includes a television/monitor 121, video recorder/playback device 122, digital video disk (DVD) recorder/playback device 123, audio/video tuner and amplifier 124, audio playback/recorder device 125, and compact disk player 126 coupled to the common I/O bus. The video recorder/playback device 122, DVD recorder/playback device 123, audio playback/recorder device 125, and compact disk player 126 may be single disk or single cassette devices, or alternatively may be multiple disk or multiple cassette devices.

In addition, the entertainment system 100 includes a speaker system 131, microphone 132, video camera 133, and a wireless I/O control device 134. In one embodiment, wireless I/O control device 134 is an entertainment system remote control unit which communicates with the components of the entertainment system 100 through IR signals. In another embodiment, wireless I/O control device 134 may be a wireless keyboard and cursor positioning device that communicates with the components of entertainment system 100 through IR signals or RF signals. In yet another embodiment, wireless I/O control device 134 may be an IR remote control device similar in appearance to a typical entertainment system remote control with the added feature of a track-ball, which allows a user to position a cursor on a display of the entertainment system 100.

The entertainment system 100 also includes a system controller 140. According to one embodiment of the present invention, the system controller 140 operates to receive broadcast data available from a plurality of broadcast data sources and analyze the broadcast data to determine which portion of the broadcast data contains commercials and which portions of the programming data do not contain commercials. According to another embodiment of the present invention, system controller 140 is configured to control a wide variety of features associated with each of the system components. As shown in FIG. 1, system controller 140 is coupled, either directly or indirectly, to each of the system components, as necessary, through I/O bus 110. In one embodiment, in addition to or in place of I/O bus 110, system controller 140 is configured with a wireless communication transmitter (or transceiver), which is capable of communicating with the system components via IR signals or RF signals 110'. Regardless of the control medium, the system controller 140 is configured to control one or more of the entertainment system components of the entertainment system 100, although it is understood that each of the components may be individually controlled with wireless I/O control device 134.

As illustrated in FIG. 1, entertainment system 100 may be configured to receive broadcast data from a wide variety of sources. In one embodiment, entertainment system 100 receives broadcast data from any or all of the following sources: cable broadcast 141, satellite broadcast 142 (e.g., via a satellite dish), very high frequency (VHF) or ultra high frequency (UHF) radio frequency communication of the broadcast networks 143 (e.g., via an aerial antenna), telephone/computer network interface 144, and/or information stored locally at system controller 140 or another component of the entertainment system 100. Further, it will be appreciated by one skilled in the art, that cable broadcast input 141, satellite broadcast input 142 and VHF/UHF input 143 may receive input from digital broadcast programming and digital cable programming. The broadcast data may be received by the entertainment system 100 via the audio/video tuner and amplifier 124, the system controller 140, or other system components or combination of system components.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
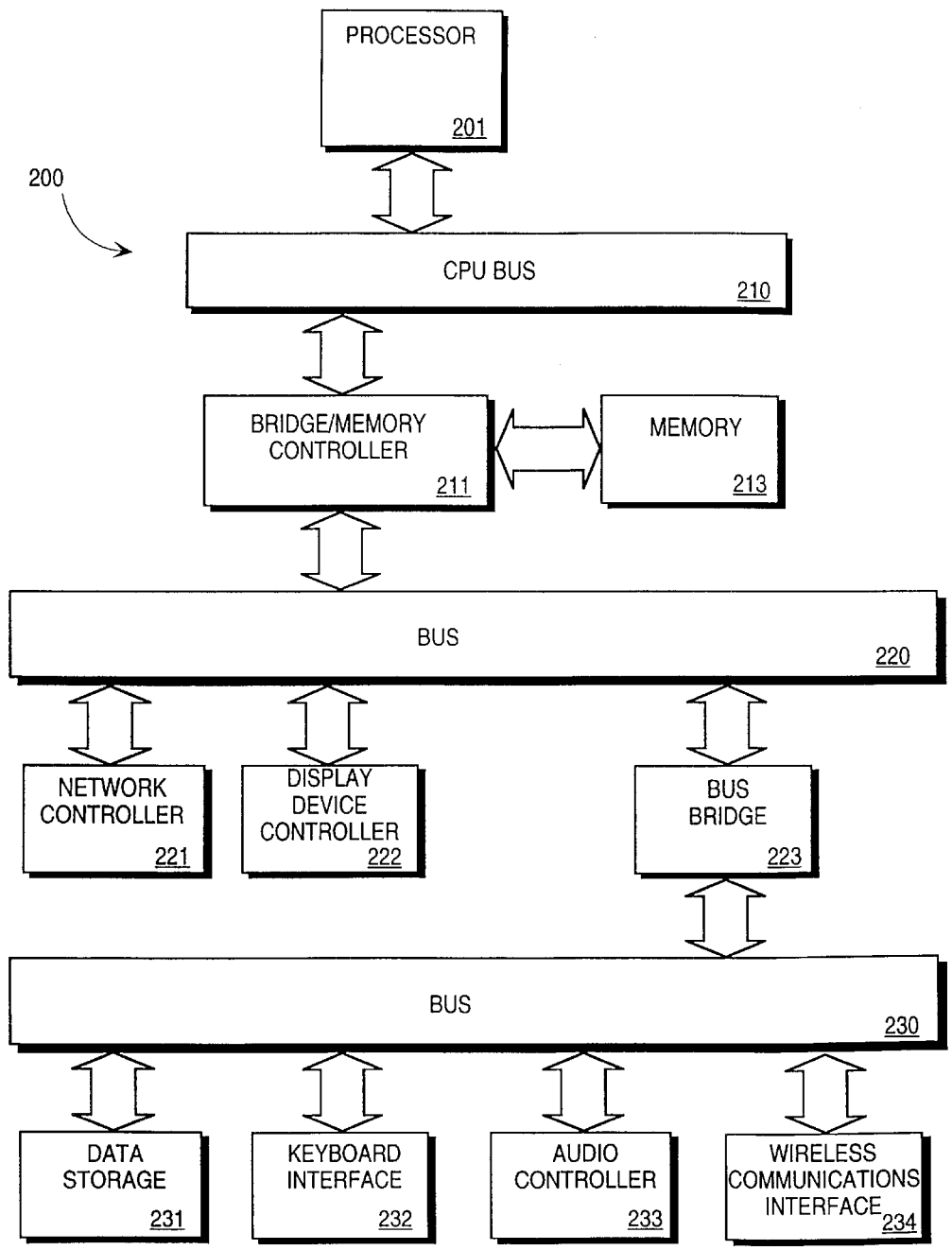
FIG. 2 is a block diagram illustrating one embodiment of a system controller according to the present invention.

FIG. 2 is a block diagram illustrating an embodiment of a computer system 200 that may be used to implement the system controller 140 according to the present invention. The computer system 200 includes a processor 201 that processes digital data signals. The processor 201 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 which transmits data signals between processor 201 and other components in the computer system 200.

As an example, memory 213 may be a dynamic random access memory (DRAM) device, a static random access memory (SRAM) device, or other memory device. The memory 213 stores information or other intermediate data signals that are executed by the processor 201. A cache memory 202 resides inside processor 201 that stores information or other intermediate data signals that is stored in memory 213. The cache 202 speeds up memory accesses by the processor 201 by taking advantage of its locality of access. In an alternate embodiment of the computer system 200, the cache 202 or a second cache resides external to the processor 201.

A bridge memory controller 211 is coupled to the CPU bus 210 and the memory 213. The bridge memory controller 211 directs data signals between the processor 201, the memory 213, and other components in the computer system 200 and bridges the data signals from these components to a first I/O bus 220.

The first I/O bus 220 may be a single bus or a combination of multiple buses. As an example, the first I/O bus 220 maybe a high performance I/O bus that operates at high throughput rates. The first I/O bus 220 may include for example a Peripheral Components Interconnect (PCI) bus, a Personal Computer Memory Card International Association (PCMCIA) bus, a NuBus, or other buses. The first I/O bus 220 provides communication links between components in the computer system 200. A network controller 221 links the computer system 200 to a network of computers and supports communication among the machines. A display device controller 222 is coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200.

A second I/O bus 230 may be a single bus or a combination of multiple buses. The second I/O bus 230 may include an Industry Standard Architecture (ISA) bus, an Extended Industry Standard Architecture (EISA) bus, or other buses. The second I/O bus 230 provides communication links between components in the computer system 200. A keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. A data storage device 231 may be a hard disk drive, a floppy disk drive, a CD-ROM device, a flash memory device or other mass storage device. An audio controller 233 operates to coordinate the recording and playing of sounds is also coupled to the I/O bus 230. A wireless communications interface 234 may be an IR transceiver or a RF transceiver for transmitting and receiving signals between system components of the entertainment system 100 (shown in FIG. 1).

A bus bridge 223 couples the first I/O bus 220 to the second I/O bus 230. The bus bridge 223 operates to buffer and bridge data signals between the first I/O bus 220 and the second I/O bus 230.

According to one embodiment, managing the recording of broadcast data is performed by the computer system 200 in response to the processor 201 executing sequences of instructions contained in the memory 213. Such instructions may be read into the memory 213 from other computer-readable mediums such as data storage device 231 or from a computer connected to the network via the network controller 211. Execution of the sequences of instructions contained in the memory 213 causes the processor to manage the recording of broadcast data, as will be described hereafter. In alternative embodiments, hard-wire circuitry may be used in place of or in combination with software instructions to implement the present invention. Thus, the present invention is not limited to any specific combination of hardware circuitry and software.

Figure 3:
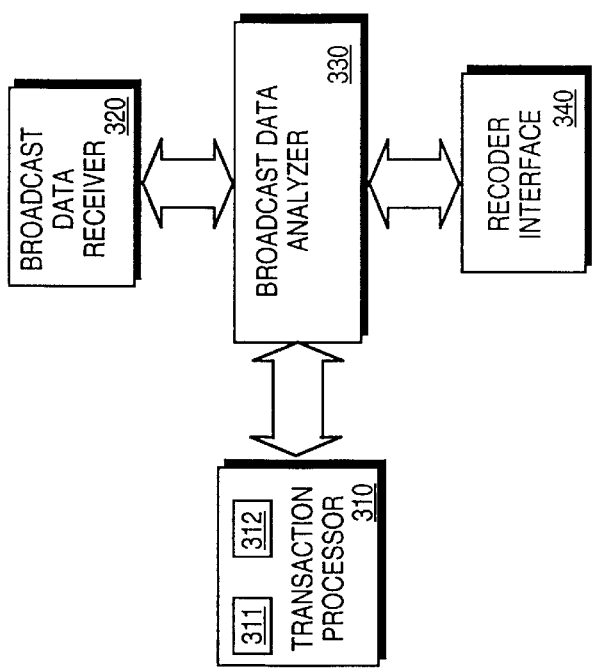
FIG. 3 is a block diagram of modules implementing an embodiment of the present invention.

FIG. 3 is a block diagram illustrating an embodiment of modules of a broadcast data recording manager 300, according to the present invention. The modules may be implemented by software, hardware, or a combination of both hardware and software. Block 310 represents a transaction processor that receives a request to record broadcast data without commercials. The transaction processor includes a log 311 that records programming information about the broadcast data that is to be recorded. The transaction processor also includes an external interface 312 that forwards the programming information recorded in the log 311 to an external computer system. According to an embodiment of the present invention, the external interface 311 may forward the programming information through a network via the network controller 221 (shown in FIG. 2). The log 311 and the external interface 312 may be implemented by any known circuitry or technique.

Block 320 represents a broadcast data receiver. The broadcast data receiver 320 operates to receive broadcast data from a plurality of sources including analog and digital broadcast data such as cable broadcast input, satellite broadcast input, and VHF/UHF input. The broadcast data receiver 320 may comprise a video card with a tuner and amplifier, a connection to cable or satellite broadcast sources, or other circuitry. According to an embodiment of the present invention, the broadcast data receiver 320 operates to digitize broadcast data received in analog format before displaying the broadcast data on a display device.

Block 330 represents a broadcast data analyzer. The broadcast data analyzer 330 is coupled to the transaction processor 310 and the broadcast data receiver 320. The broadcast data analyzer 330 receives requests from the transaction processor 310 to record programming data received from the broadcast data receiver 320. The broadcast data analyzer 330 monitors the broadcast data for commercial indicators and program indicators. Commercial indicators indicate that a commercial is broadcasted or will be broadcasted on the broadcast data. A commercial indicator may be, for example, a message in the VBI stating that a commercial will be broadcasted on the broadcast data, a fade to back, or an increase in the volume signal. Program indicators indicate that a program is broadcasted or will be broadcasted on the broadcast data. A program indicator may be, for example, a message in the VBI stating that a program is will be broadcasted on the broadcast data, a fade to black after a commercial, or a decrease in the volume signal. From the commercial indicators and program indicators, the broadcast data analyzer 330 makes a determination as to which broadcast data is a commercial and which broadcast data is program data.

Block 340 represents a recorder interface 340. According to an embodiment of the present invention, the recorder interface 340 communicates with the wireless communication interface 234 (shown in FIG. 2) instructing the wireless communication interface to transmit commands to the video recording and playback device 122 (shown in FIG. 1). The recorder interface 340 is coupled to the broadcast data analyzer 330 and is informed by the broadcast data analyzer 330 as to which broadcast data is a commercial and which broadcast data is program data. The recorder interface 340 instructs the wireless communication interface 234 to transmit the appropriate commands to the video recording and playback device 122 such that the video recording and playback device 122 may make a recording of broadcast data without commercials. It should be appreciated that the recorder interface 340 may program the video recording and playback device 122 using any known technique to make a recording of the broadcast data without commercials. The transaction processor 310, broadcast data receiver 320, broadcast data analyzer 330, and the recorder interface 340 may be implemented by any known circuitry or technique.

Figure 4:
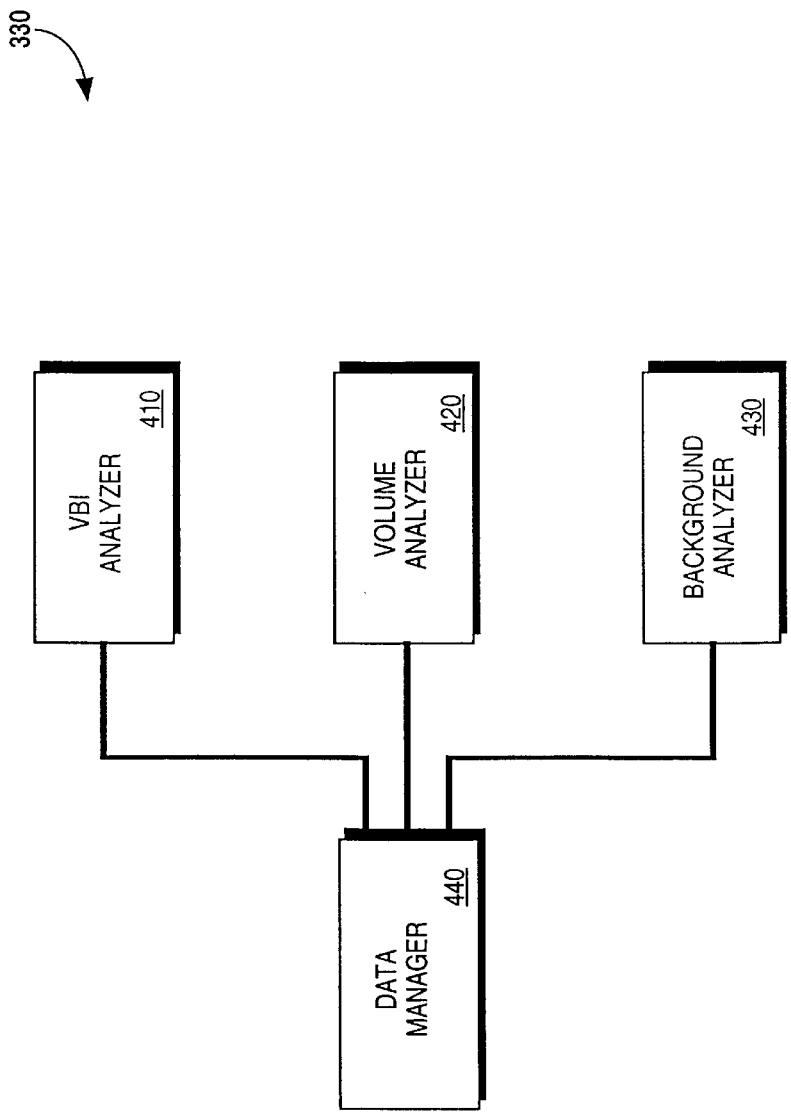
FIG. 4 is a block diagram illustrating an embodiment of the program data analyzer according to the present invention.

FIG. 4 is a block diagram illustrating an embodiment of modules of a broadcast data analyzer 330 according to the present invention. The modules may be implemented by software, hardware, or a combination of both hardware and software. Block 440 represents a data manager. Block 410 represents a VBI analyzer. Block 420 represents a volume analyzer. Block 430 represents a background analyzer. The data manager 440 is coupled to the VBI analyzer 410, volume analyzer 420, and background analyzer 430. The data manager 440 receives the broadcast data from the broadcast data receiver 320 (shown in FIG. 3) and forwards the broadcast data to the VBI analyzer 410, volume analyzer 420, and background analyzer 430 to detect commercial and program indicators. The VBI analyzer 410 operates to read the VBI of analog broadcast data. Messages in the VBI that announce that a commercial is to be broadcasted and that a program is to resume serve as commercial and program indicators to the VBI analyzer. When the VBI analyzer 410 finds a message in the VBI that indicates that a commercial is to be broadcasted in the broadcast data, the VBI analyzer 410 sends a VBI commercial detection signal to the data manager 440. When the VBI analyzer 410 finds a message in the VBI that indicates that program data is to be broadcasted in the broadcast data, the VBI analyzer 420 sends a VBI program detection signal to the data manager 440.

The volume analyzer 420 operates to monitor the amplitude of the audio signal in analog and digital broadcast data. Increases and decreases in volume level in broadcast data serve as commercial and program indicators to the volume analyzer 420. When the volume level in the broadcast data increases beyond a reference level, the volume analyzer 420 sends a volume commercial detection signal to the data manager 440. When the volume level in the broadcast data returns to the reference level, the volume analyzer 420 sends a volume program detection signal to the data manager 440. According to an embodiment of the present invention, the volume analyzer 420 calculates an average volume level of previously broadcasted program data and defines the reference level with that value. When the volume level of the broadcast data exceeds the average level of previously broadcasted program data, the volume analyzer 420 informs the data manager 440 that a commercial is being broadcasted. Similarly, when the volume level of the broadcast data returns to the reference level after exceeding the reference level, the volume analyzer 420 informs the data manager 440 that program data is being broadcasted.

The background analyzer 430 operates to monitor the amplitude of the video signal in the analog and digital broadcast data. A drop in the video signal to a black level for a predetermined period of time serves as a commercial and program indicator to the background analyzer. When the video signal drops to a black level for a predetermined period of time during when a black background is broadcasted, the background analyzer 430 sends a background commercial/program detection signal to the data manager 440.

The data manager 440 receives the VBI commercial and program detection signals from the VBI analyzer 410, volume commercial and program detection signals from the volume analyzer 420, and background commercial/program detection signals from the background analyzer 430 and makes a determination from the signals as to whether a commercial is to be broadcasted in the broadcast data or whether program data is to be broadcasted in the broadcast data. According to an embodiment of the present invention, the data manager 440 relies only on the VBI commercial and program detection signals from the VBI analyzer 410 to determine whether a commercial or program data is being broadcasted when VBI commercial and program detection signals are received from the VBI analyzer 410. When VBI commercial and program detection signals are not received from the VBI analyzer 410, the data manager 440 relies on the volume commercial and program detection signals from the volume analyzer 420 and the background commercial/program detection signal from the background analyzer 420 to determine whether a commercial or program data is being broadcasted.

In a preferred embodiment of the present invention, the broadcast data analyzer 330 includes the VBI analyzer 410, the volume analyzer 420, and the background analyzer 430. However, it should be appreciated that broadcast data analyzer 330 may be configured with any one or combination of the VBI analyzer 410, the volume analyzer 420, and the background analyzer 430. The VBI analyzer 410, the volume analyzer 420, and the background analyzer 430 may be configured using any known technique.

According to an embodiment of the present invention, when the data manager 440 relies on the volume commercial and program detection signals from the volume analyzer 420 and the background commercial/program detection signal from the background analyzer to determine whether a commercial or program data is being broadcasted, an amount of time is required for the broadcast data to be analyzed before the appropriate commands can be conveyed to the recording and playback device 122 (shown in FIG. 1) to exit or enter the record mode. According to one embodiment of the present invention, a delay unit is coupled to the video recording and playback device 122 that provides a delay in time before broadcast data is sent to the video recording and playback device 122. The delay in time allows the broadcast data analyzer 330 to determine whether a commercial or program data is being broadcasted and convey the appropriate commands to the video recording and playback device 122 to produce a recording of the broadcast data without commercials. It should be appreciated that the delay unit may be configured on the video recording and playback device 122 or external to the video recording and playback device 122. The delay unit may be implemented by any known circuitry or technique.

According to a second embodiment of the present invention, the video recording and playback device 122 is programmed to continue recording the broadcast data after the video signal has dropped to a black level until the data manager 440 is able to determine whether the broadcast data broadcasted after the video signal has dropped to the black level is a commercial or program data. If the broadcast data is determined to be program data, the video recording and playback device 122 is programmed to continue recording the broadcast data. If the broadcast data is determined to be a commercial, the video recording and playback device 122 is programmed to exit the record mode and return to the location in the recording medium where the video signal had dropped to the black level. The video recording and playback device 122 is programmed to return to record mode after the video signal has dropped to the black level a second time. The video recording and playback device 122 records the broadcast data until the data manager 440 is able to determine whether the broadcast data broadcasted after the video signal has dropped to the black level the second time is a commercial or program data. Similarly, if the broadcast data is determined to be program data, the video recording and playback device 122 is programmed to continue recording the broadcast data. If the broadcast data is determined to be a commercial, the video recording and playback device 122 is programmed to exit the record mode and return to the location in the recording medium where the video signal had dropped to the black level the second time.

According to an embodiment of the present invention, the broadcast data receiver 320 (shown in FIG. 3) also operates to read digital broadcast data from digital broadcast data sources and selects a stream of digital broadcast data from the digital broadcast data source that a viewer wishes to view. For example, if the digital broadcast data source provides a plurality of streams of digital broadcast data including broadcast data with commercials, broadcast data without commercials, broadcast data with high definition, and broadcast data with low definition, the broadcast data receiver 320 operates as a switch to direct the stream of broadcast data that the viewer selects to a display device or television monitor. According to this embodiment, the selection made by the viewer may be recorded in the log 311 in the transaction processor 310 and forwarded to an external computer system via external interface 312.

Figure 5:
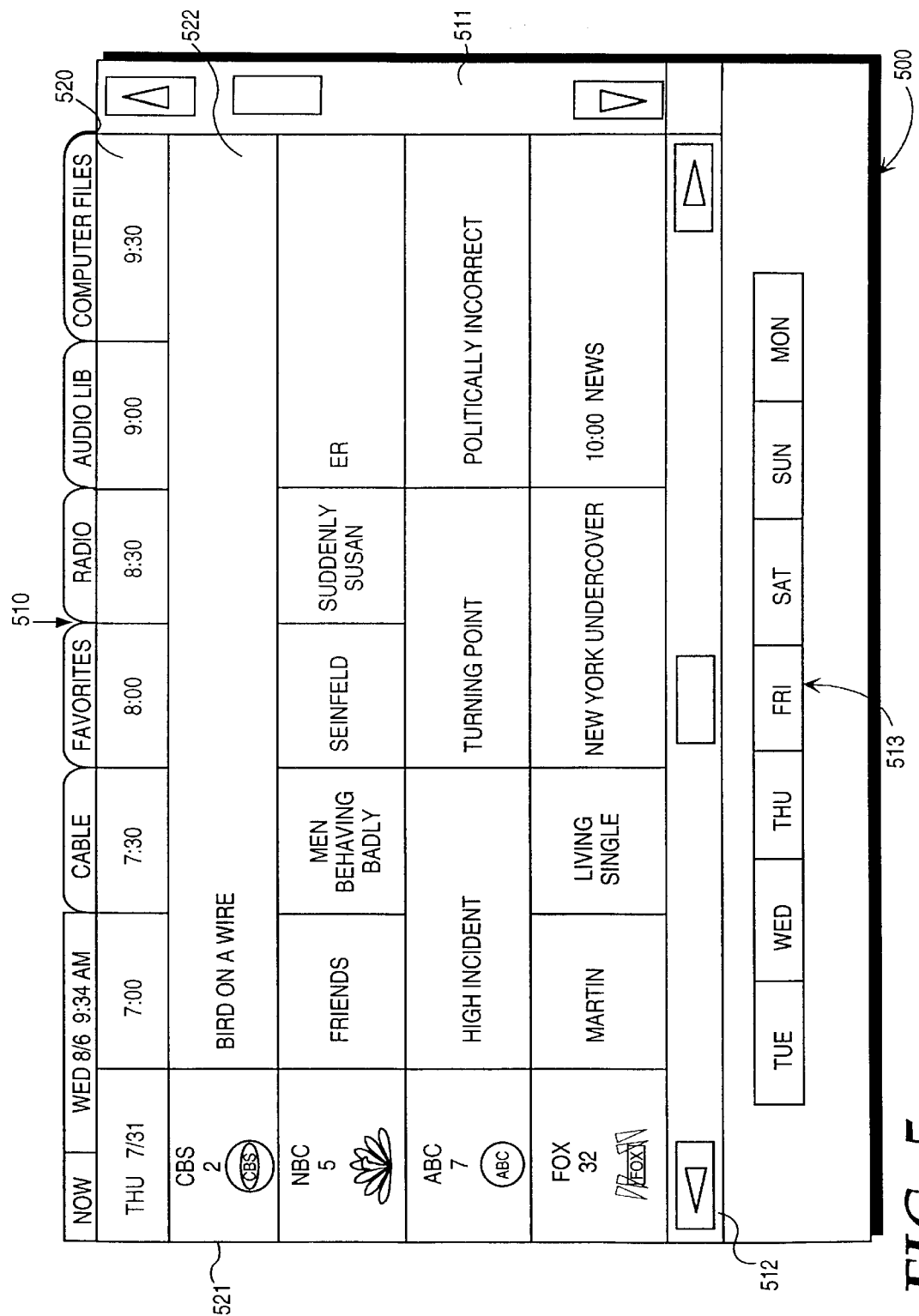
FIG. 5 illustrates a first graphical user interface according to an embodiment of the present invention.

FIG. 5 illustrates an example of a graphical user interface according to an embodiment of the present invention. The graphical user interface 500 is generated by the transaction processor 310 (shown in FIG. 3) and may be displayed to a user via the television/monitor 121 (shown in FIG. 1). The graphical user interface 500 includes an entertainment category display 510 that lists the categories of entertainment system data that may be displayed by the graphical user interface 500. The graphical user interface shown in FIG. 5 is configured to display broadcast data selections corresponding to the user's pre-set favorite television channels. The graphical user interface 500 includes a selection listing area 522 that displays the names of broadcast data selections that are broadcasted, a time heading 520 that displays the times that broadcast selections are broadcast, and a source heading 521 that displays the source of the broadcast data selections in a grid format. The graphical user interface 500 also includes scroll bars 511 and 512 and a day of the week selection bar 513 that allows a user to browse other broadcast data selections.

Figure 6:
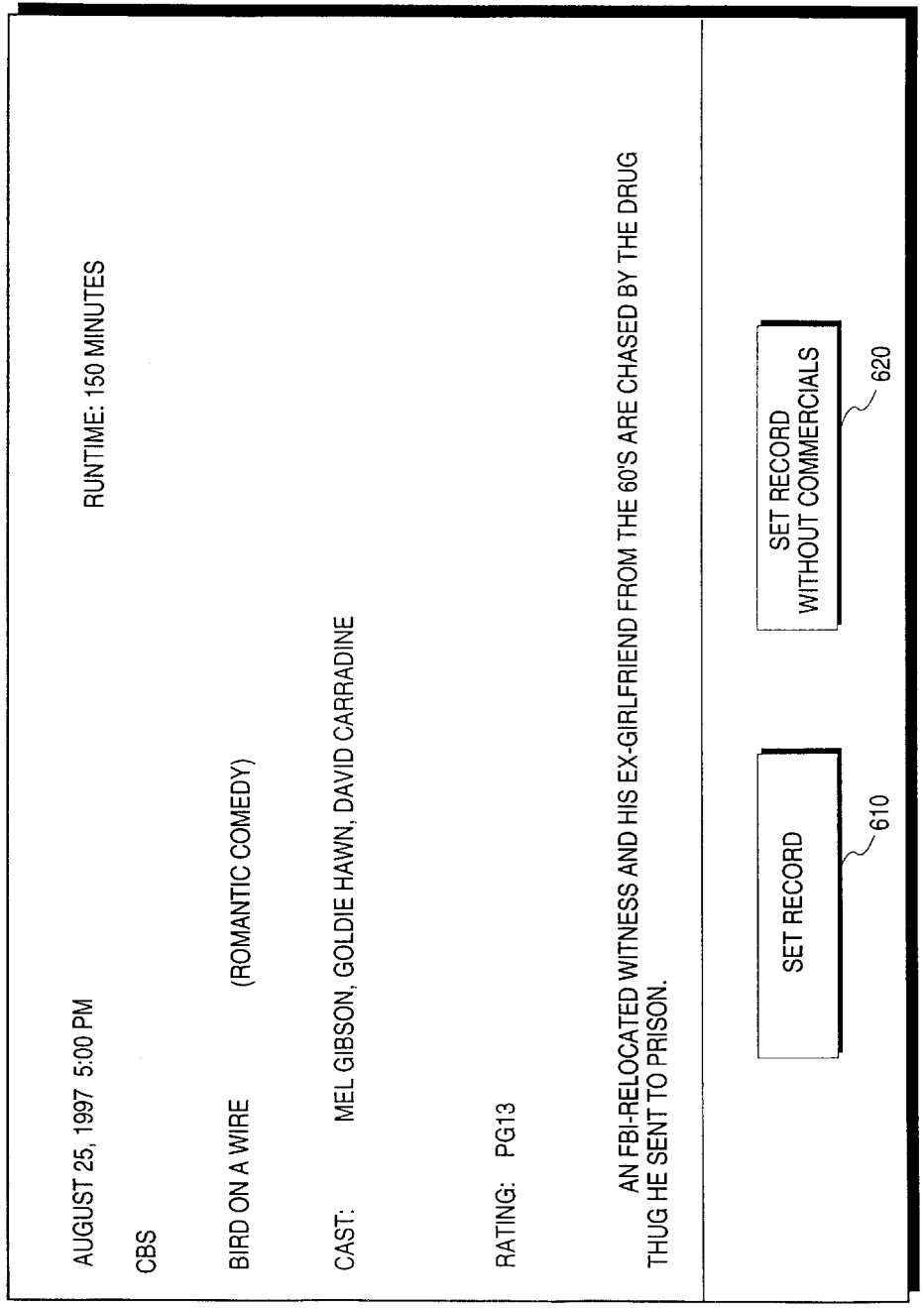
FIG. 6 illustrates a second graphical user interface according to an embodiment of the present invention.

According to an embodiment of the present invention, sections of the selection listing area 522 corresponding to an broadcast data selection may be selected by a user. When selected, the transaction processor 310 (shown in FIG. 3) generates a second graphical user interface shown in FIG. 6. The graphical user interface 600 includes a first user-selectable interface 610 that allows a user to record the broadcast data selection at the time it is broadcasted in its entirety. The graphical user interface 600 also includes a second user-selectable interface 620 that allows a user to record the broadcast data selection at the time it is broadcasted without commercials. Upon selecting one of the first or second user-selectable interfaces, the transaction processor 310 records the request in a log 311 (shown in FIG. 3) and forwards the request to the broadcast data analyzer 330 (shown in FIG. 3).

Figure 7:
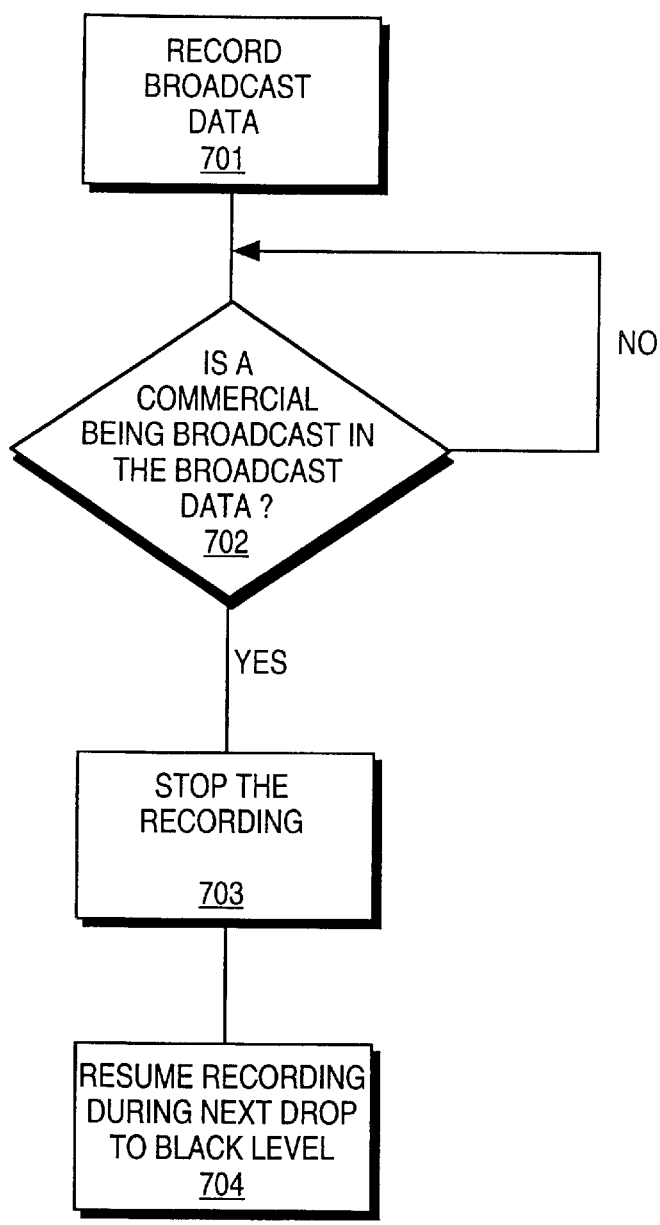
FIG. 7 is a flow chart illustrating a first method for managing recording broadcast data according to an embodiment of the present invention.

FIG. 7 illustrates a method for managing recording of broadcast data according to an embodiment of the present invention. According to one embodiment of the present invention, the method illustrated in FIG. 7 is used when broadcasted data is recorded in real-time without a delay unit. At step 701, the broadcast data is recorded on a recordable medium.

At step 702, it is determined whether a commercial or a program is being broadcasted in the broadcast data. If a commercial is being broadcasted in the broadcast data, control proceeds to step 703. If a program is being broadcasted in the broadcast data, control returns to step 702. According to one embodiment of the present invention, determining whether the broadcast data is a commercial or a program is achieved by reading a vertical blanking interval of the broadcast data for a message indicating whether the broadcast data is a commercial or a program. According to a second embodiment of the present invention, determining whether the broadcast data is a commercial or a program comprises monitoring an amplitude of an audio signal of the broadcast data for an increase in volume level and monitoring an amplitude of a video signal of the broadcast data for a drop of the video signal to a black level.

At step 703, the recording is stopped.

At step 704, the recording is resumed at a location on the recordable medium where a previously recorded video signal in the broadcast data dropped to a black level after a next video signal in the broadcast data drops to the black level.

Figure 8:
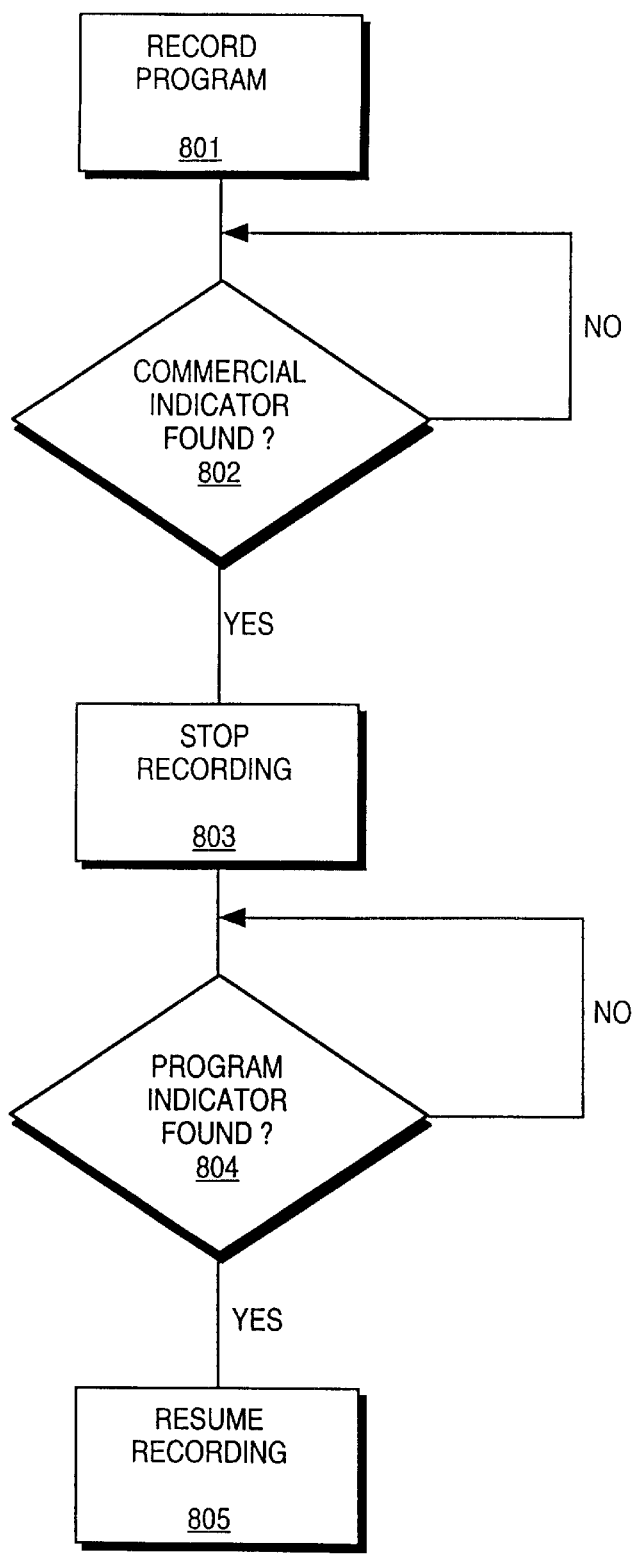
FIG. 8 is a flow chart illustrating a second method for managing recording of broadcast data according to an embodiment of the present invention.

FIG. 8 is a flow chart illustrating a method for managing recording of broadcast data according to a second embodiment of the present invention. According to an embodiment of the present invention, the method illustrated in FIG. 8 is used when broadcast data is recorded with a delay unit. At step 801, a program is recorded from the broadcast data.

At step 802, the broadcast data is monitored for a commercial indicator. If a commercial indicator is found, control proceeds to step 803. If a commercial indicator is not found, control returns to step 802. According to one embodiment of the present invention monitoring the broadcast data for the commercial indicator comprises reading a vertical blanking interval of the broadcast data for a message indicating that a commercial will be broadcasted. According to a second embodiment of the present invention, monitoring the broadcast data for the commercial indicator comprises monitoring an amplitude of an audio signal of the broadcast data for an increase in volume level and monitoring an amplitude of a video signal of the broadcast data for a drop of the video signal to a black level.

At step 803, the recording is stopped.

At step 804, the broadcast data is monitored for a program indicator. If a program indicator is found, control proceeds to step 805. If a program indicator is not found, control returns to step 804. According to one embodiment of the present invention monitoring the broadcast data for the program indicator comprises reading a vertical blanking interval of the broadcast data for a message indicating that a program will be broadcasted. According to a second embodiment of the present invention, monitoring the broadcast data for the program indicator comprises monitoring an amplitude of an audio signal of the broadcast data for a decrease in volume level and monitoring an amplitude of a video signal of the broadcast data for a drop of the video signal to a black level.

At step 805, the recording is resumed.

In the foregoing specification, the invention has been described with references to specific embodiments thereof. It will however be evident that various modifications and changes may be made thereto without departing from the broader spirit and scope of the invention. The specification and drawings are, accordingly, to be regarded in an illustrative rather than restrictive sense.

What is claimed is:

1. A method for managing recording of broadcast data, comprising:

providing the broadcast data to a video recording device;

delaying the broadcast data that is provided to the video recording device sufficient to allow for the finding of an indicator and the transmitting of a command to the video recording device;

recording the broadcast data using the video recording device;

monitoring the broadcast data for a commercial indicator;

if a commercial indicator is found, transmitting a command to the video recording device to stop recording;

if a commercial indicator is not found, continuing recording;

monitoring the broadcast data for a program indicator;

if a program indicator is found. transmitting a command to the video recording device to resume recording;

if a program indicator is not found, continuing the recording stop; and transmitting a record of the recording of broadcast data to an external computer through a network.

2. The method of claim 1, wherein monitoring the broadcast data for a commercial indicator or a program indicator comprises reading a vertical blanking interval of the broadcast data for a message indicating whether the broadcast data is a commercial or a program.

3. The method of claim 1, wherein monitoring the broadcast data for a commercial indicator or a program indicator comprises monitoring an amplitude of an audio signal of the broadcast data for an increase in volume level.

4. The method of claim 1, wherein monitoring the broadcast data for a commercial indicator or a program indicator comprises monitoring an amplitude of a video signal of the broadcast data for a drop of the video signal to a black level.

5. The method of claim 1, wherein transmitting a command to the video recording device comprises instructing a wireless communication interface to transmit commands to a video recording device using infra-red signals.

6. The method of claim 1, further comprising receiving a request to record a broadcast data program without commercials from a user through a user interface.

7. The method of claim 1, further comprising transmitting a record of the recording of broadcast data to an external computer through a network.

8. A computer-readable medium having stored thereon sequences of instructions, the sequences of instructions including instructions which, when executed by a processor, cause the processor to perform:

providing the broadcast data to a video recording device;

delaying the broadcast data that is provided to the video recording device sufficient to allow for the finding of an indicator and the transmitting of a command to the video recording device;

recording broadcast data using the video recording device;

monitoring the broadcast data for a commercial indicator;

if a commercial indicator is found, transmitting a command to the video recording device to stop recording;

if a commercial indicator is not found, continuing recording;

monitoring the broadcast data for a program indicator;

if a program indicator is found, transmitting a command to the video recording device to resume recording;

if a program indicator is not found, continuing the stop; and transmitting a record of the recording of broadcast data to an external computer through a network.

9. The computer-readable medium of claim 8, wherein monitoring the broadcast data for a commercial indicator or a program indicator comprises reading a vertical blanking interval of the broadcast data for a message indicating whether the broadcast data is a commercial or a program.

10. The computer-readable medium of claim 8, wherein monitoring the broadcast data for a commercial indicator or a program indicator comprises monitoring an amplitude of an audio signal of the broadcast data for an increase in volume level.

11. The computer-readable medium of claim 8, wherein monitoring the broadcast data for a commercial indicator or a program indicator comprises monitoring an amplitude of a video signal of the broadcast data for a drop of the video signal to a black level.

12. A broadcast data recording manager, comprising:

a broadcast data analyzer that determines which part of broadcast data includes commercials by monitoring the broadcast data for commercial indicators and for program indicators;

a recorder interface, coupled to the broadcast data analyzer, that based on the commercial indicators and the program indicators transmits commands to a video recording device to generate a recording of the broadcast data without commercials;

a delay unit, coupled between the broadcast data and the video recording device for delaying the broadcast data sufficient to allow for the finding of an indicator and the transmitting of a command to the video recording device; and a transaction processor coupled to the broadcast data analyzer that records a request to produce a recording of a program in broadcast data without commercials, the transaction processor comprising:

a log that records programming information about the broadcast data that is requested to be recorded; and an external interface, coupled to the log, that transmits the programming information to an external computer system.

13. The manager of claim 12, further comprising a transaction processor coupled to the broadcast data analyzer that records a request to produce a recording of a program in broadcast data without commercials, the transaction processor comprising:

a log that records programming information about the broadcast data that is requested to be recorded; and an external interface, coupled to the log, that transmits the programming information to an external computer system.

14. The manager of claim 12, wherein the broadcast data analyzer comprises a vertical blanking interval (VBI) analyzer that reads the VBI for a message indicating that a commercial is to be broadcasted.

15. The manager of claim 12, wherein the broadcast data analyzer comprises a volume analyzer that monitors an amplitude of an audio signal of the broadcast data for an increase in volume level.

16. The manager of claim 12, wherein the broadcast data analyzer comprises a background analyzer that monitors an amplitude of a video signal of the broadcast data for a drop of the video signal to a black level.

17. The manager of claim 12, wherein the recorder interface further comprises a wireless communication interface to transmit commands to the video recording device using infra-red signals.

* * * * *